(12) United States Patent
Puma et al.

(10) Patent No.: US 12,739,707 B2
(45) Date of Patent: Sep. 15, 2026

(54) INTELLIGENT SPECTRUM MANAGEMENT SYSTEM FOR PRIVATE NETWORKS

(71) Applicant: Boost SubscriberCo L.L.C., Englewood, CO (US)

(72) Inventors: John Puma, Castle Rock, CO (US); Stacey Osborn, Arvada, CO (US); Montgomery Groff, Denver, CO (US); Ross Drennan, Monument, CO (US); Paul Keator, Elizabeth, CO (US); Mark Templeman, Parker, CO (US); Marcel Guajardo, Lakewood, CO (US); Gerard Canavan, Englewood, CO (US); Adam Saenger, Castle Pines, CO (US)

(73) Assignee: BOOST SUBSCRIBERCO L.L.C., Englewood, CO (US)

( * ) Notice: Subject to any disclaimer, the term of this patent is extended or adjusted under 35 U.S.C. 154(b) by 848 days.

(21) Appl. No.: 17/975,330

(22) Filed: Oct. 27, 2022

(65) Prior Publication Data

US 2024/0147309 A1 May 2, 2024

(51) Int. Cl.
*H04W 28/24* (2009.01)
*H04L 5/00* (2006.01)
(Continued)

(52) U.S. Cl.
CPC ........... *H04W 28/24* (2013.01); *H04L 5/0094* (2013.01); *H04W 28/0967* (2020.05); *H04W 72/0446* (2013.01); *H04W 72/543* (2023.01)

(58) Field of Classification Search
CPC ............................ H04L 5/0094; H04W 28/24; H04W 28/0967; H04W 72/543; H04W 72/0446
See application file for complete search history.

(56) References Cited

U.S. PATENT DOCUMENTS 7,424,268 B2 9/2008 Diener et al.
2011/0280194 A1* 11/2011 Schmidt ................ H04W 72/02 370/328

(Continued)

OTHER PUBLICATIONS

"3rd Generation Partnership Project; Technical Specification Group Services and System Aspects; System architecture for the 5G System (5GS); Stage 2 (Release 15)," 3GPP TS 23.501 V15.13.0, Technical Specification, Mar. 2022, 250 pages.

(Continued)

*Primary Examiner* — Sujoy K Kundu
*Assistant Examiner* — Weibin Huang
(74) *Attorney, Agent, or Firm* — Seed Intellectual Property Law Group LLP

(57) ABSTRACT

A method of operating a communication system includes: obtaining location information indicating a location of a private network and initial performance requirement information indicating initial performance requirements of the private network; obtaining, based on the location information and the initial performance requirement information, initial spectrum information indicating one or more initial licensed frequency bands and one or more initial unlicensed frequency bands; transmitting the initial spectrum information to an external device; obtaining updated performance requirement information indicating updated performance requirements of the private network; obtaining, based on the updated performance requirement information, updated spectrum information indicating one or more updated licensed frequency bands and one or more updated unlicensed frequency bands; and transmitting the updated spectrum information to the external device. An access point device of the private network transmits messages to client devices using frequency bands indicated by the initial spectrum information and the updated spectrum information.

20 Claims, 6 Drawing Sheets

(51) Int. Cl.

| | |
|---|---|
| ***H04W 28/08*** | (2023.01) |
| ***H04W 72/0446*** | (2023.01) |
| ***H04W 72/543*** | (2023.01) |

(56) References Cited

U.S. PATENT DOCUMENTS

| | | | | |
|---|---|---|---|---|
| 2015/0312623 | A1* | 10/2015 | Li | H04N 21/472<br>725/74 |
| 2016/0014610 | A1* | 1/2016 | Wong | H04W 16/14<br>455/454 |
| 2017/0142592 | A1* | 5/2017 | Fischer | H04W 16/14 |
| 2018/0035284 | A1* | 2/2018 | Fujinami | H04W 8/245 |
| 2019/0230665 | A1* | 7/2019 | Lopez-Perez | H04W 74/0808 |
| 2022/0201497 | A1* | 6/2022 | Smith | G06N 20/20 |
| 2025/0159489 | A1* | 5/2025 | Sandgren | H04W 16/14 |

OTHER PUBLICATIONS

International Search Report and Written Opinion for International Application No. PCT/US2023/077785, dated Feb. 29, 2024, 13 pages.

Jabandzic et al., “Enabling Generic Wireless Coexistence Through Technology-Agnostic Dynamic Spectrum Access,” Wireless Personal Communications, Mar. 20, 2019, 28 pages.

* cited by examiner

INTELLIGENT SPECTRUM MANAGEMENT SYSTEM FOR PRIVATE NETWORKS

BACKGROUND

Conventionally, cellular access point devices communicate with client devices using cellular communications standards (e.g., 4G LTE or 5G communications standards from the 3rd Generation Partnership Project (3GPP)). Also, wireless local area network (WLAN) access point devices communicate with client devices using WLAN communications standards (e.g., Wi-Fi using one or more of the 802.11 family of communications standards from the Institute of Electrical and Electronics Engineers (IEEE)). Conventional access point devices, however, are not able to communicate with client devices using both cellular communications standards and WLAN communications standards. Thus, spectrum allocation for cellular communications is done separately from spectrum allocation for WLAN communications. In addition, conventional access point devices are not capable of being dynamically reconfigured to use additional or fewer frequency bands for communications using cellular communications standards and WLAN communications standards as demands on those access point devices change over time.

BRIEF SUMMARY

The present disclosure teaches private networks that include access point devices that communicate with client devices using both cellular communications standards and WLAN communications standards. In addition, the present disclosure teaches spectrum management devices that perform spectrum allocation for private networks including access point devices that communicate with client devices using both cellular communications standards and WLAN communications standards. As requirements of those private networks change, the spectrum management devices dynamically allocate both licensed and unlicensed frequency bands used for cellular and WLAN communications by the access point devices so that the private networks can satisfy the requirements as they change over time. Such frequency bands can include Extremely Low Frequency (ELF), Ultra Low Frequency (ULF), Low Frequency (LF), Medium Frequency (MF), Ultra High Frequency (UHF), and Extremely High Frequency (EHF) frequency bands.

In private network implementations, bandwidth/throughput, latency, priority level, and reliability requirements can change over time making a single option or solution either overly costly or less reliable. For example, private network customers operating concert or sports venues only need a limited amount of bandwidth/spectrum during day-to-day operations, but have a much higher bandwidth demand when an event is going on. In addition, point of sales operations might require specific levels of network availability and reliability. By providing and managing spectrum resources on demand and via an intelligent platform according to the present disclosure, private network customers can optimize their usage based on actual demand and current network payloads. Customers can benefit from private network operations in a "Pay for What You Need/Use" business model versus having to purchase equipment that is configured for a peak load requirement.

For example, instead of deploying a private network with enough frequency bands to satisfy a peak load requirement, the private network can be initially configured to use fewer frequency bands that satisfy an average load requirement. When the private network is expected to become more heavily loaded, or when the private network actually becomes more heavily loaded, the private network can be dynamically reconfigured to use additional frequency bands. Similarly, when the private network is expected to become less heavily loaded, or when the private network actually becomes less heavily loaded, the private network can be dynamically reconfigured to use fewer frequency bands. Accordingly, private networks according to the present disclosure can be less expensive to operate than conventional private networks that are always configured to use a relatively high number of frequency bands that satisfy peak load requirements.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present disclosure, reference will be made to the following Detailed Description, which is to be read in association with the accompanying drawings.

DETAILED DESCRIPTION

According to the present disclosure, a novel private cellular network small cell access point device utilizes a combination of unlicensed and licensed spectrum. Unlicensed spectrum includes spectrum used for Wi-Fi communications, which operate in the 2.4, 5, and 6 GHz spectrum ranges, and the Citizens Broadband Radio Service (CBRS) General Authorized Access (GAA) frequency bands in the 3.55-3.70 GHz range. Licensed spectrum includes 4G LTE spectrum bands such as the b48 band (e.g., CBRS (3.55-3.70 GHz), 5G spectrum bands such as the n48 band (e.g., CBRS (3.55-3.65 GHz) Priority Access Licenses (PALs) and the n77 band (e.g., 3.45-3.55 GHz), and may consist of other bands in the future. Access point devices according to the present disclosure are unique in that they utilize Wi-Fi and cellular (5G/4G LTE) protocols, for example, for device connectivity with end user devices. Such end user devices may include user equipment such as phones, tablets, adapters connected to industrial machinery, or Augmented Reality (AR) Virtual Reality (VR) headsets, etc. In addition, when two or more access point devices are linked together to form a private network, the access point devices can wirelessly communicate with each other using either Wi-Fi or cellular communications, or both Wi-Fi and cellular communications.

Utilization of Wi-Fi and cellular communications in a small cell requires an orchestration mechanism that manages and authorizes how applicable spectrum bands are used. This is necessary to provide only the required amount of spectrum necessary for a customer's use cases at a given point in time, which can save money compared to conventional networks that are designed for a peak load requirement and, therefore, are expensive to install and operate. Access point devices according to the present disclosure can be dynamically reconfigured to use additional spectrum as customers' needs grow and more devices are required to be connected to an existing network. Similarly, access point devices according to the present disclosure can be dynamically configured to use less spectrum as customers' needs decrease and fewer devices are required to be connected to an existing network.

Figure 1:
FIG. 1 is a diagram of a communication system in accordance with embodiments described herein.
Figure 1:
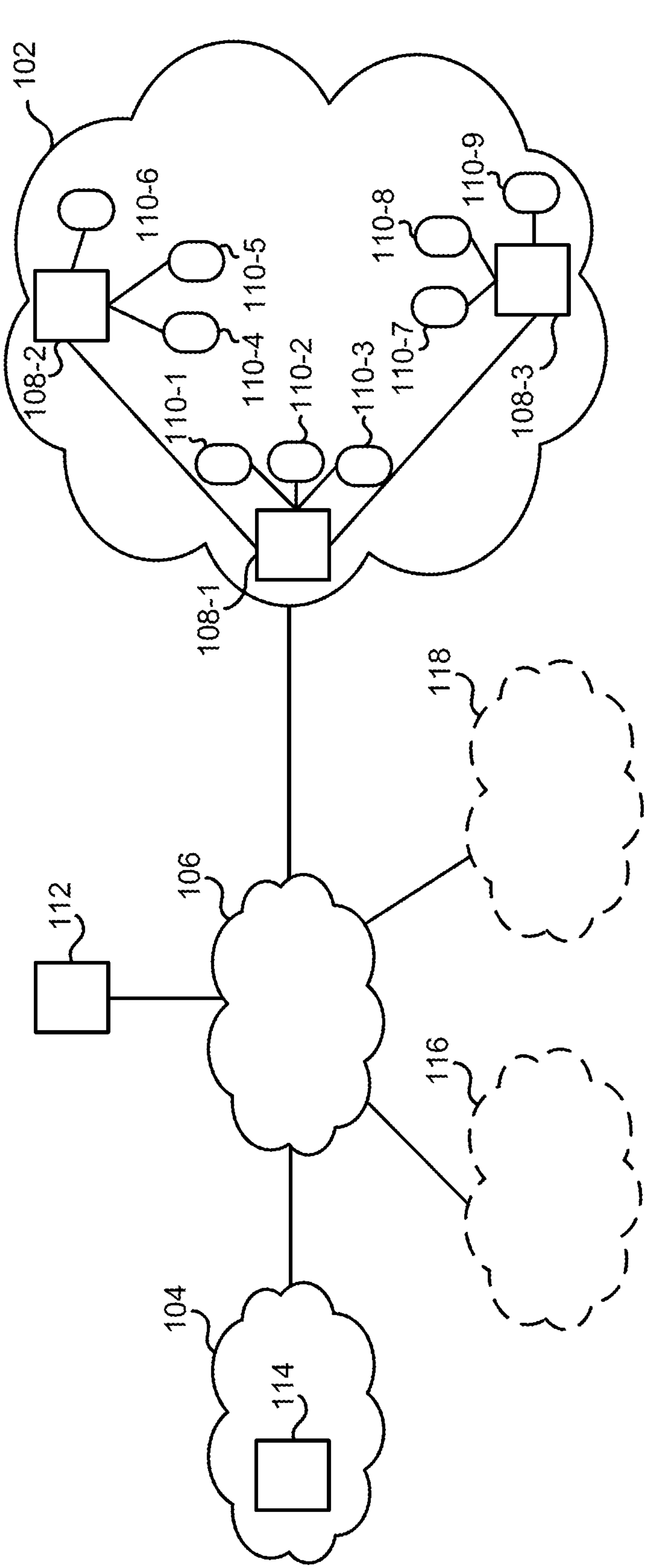

FIG. 1 is a diagram of a communication system 100 in accordance with embodiments described herein. The communication system 100 includes a private network 102 that communicates with a private network core 104 via a network 106. In one or more implementations, the network 106 is provided by a commercial Internet Service Provider (ISP).

The private network 102 is provided by access point devices 108-1, 108-2, and 108-3. Although the private network 102 shown in FIG. 1 includes three access point devices, private networks according to the present disclosure can include a different number of access point devices without departing from the scope of the present application.

Each of the access point devices 108-1, 108-2, and 108-3 communicates with at least one other of the access point devices 108-1, 108-2, and 108-3. Also, each access point device 108-1, 108-2, and 108-3 communicates with one or more client devices. The client devices may include a combination of different types of devices, such as cell phones or User Equipment (UE) devices, Augmented Reality (AR)/Virtual Reality (VR) headsets, security cameras, tablet computers, laptop computers, and wireless network adapters for industrial machinery, for example.

In the example shown in FIG. 1, the access point device 108-1 communicates with the access point devices 108-2 and 108-3. Also, the access point device 108-1 communicates with client devices 110-1, 110-2, and 110-3. The access point device 108-2 communicates with client devices 110-4, 110-5, and 110-6. The access point device 108-2 communicates with client devices 110-7, 110-8, and 110-9.

In one or more implementations, the access point device 108-1 is a root node that configures the access point devices 108-2 and 108-3. For example, a control device 112 provides configuration information to the access point device 108-1, which uses the configuration information to configure itself and the access point devices 108-2 and 108-3. The configuration information includes frequency spectrum information indicating a plurality of frequency bands to be used for different types of communications.

In one or more implementations, the access point devices 108-1, 108-2 and 108-3 are peers and are configured independently. For example, the control device 112 provides the configuration information to the access point devices 108-1, 108-2, and 108-3, which use the configuration information to configure themselves.

The communication system 100 also includes a spectrum management device 114 that operates in the private network core 104. In one or more implementations, the communication system 100 includes an enterprise Local Area Network (LAN) 116. In one or more implementations, the communication system 100 includes a network 118, which includes one or more devices that provide voice and messaging services.

The spectrum management device 114 communicates with a spectrum allocation device or platform (not shown) that stores a table or other suitable data structure in which a plurality of identifiers of geographic locations or areas are associated with one or more frequency bands that have been licensed by an operator of the communication system 100 (e.g., DISH Network). The spectrum management device 114 also communicates with a device (not shown) operated by a Spectrum Access System (SAS) service provider, which is certified by the United States (US) Federal Communication Commission (FCC), for the Citizens Broadband Radio Service (CBRS) (3.55 GHz-3.70 GHz) spectrum use grants for both unlicensed General Authorized Access (GAA) bands (3.55-3.70 GHz) as well as for licensed Priority Access License (PAL) bands (3.55-3.65 GHz) that are licensed to the operator of the communication system 100. In addition, the spectrum management device 114 communicates with a private network subscription device or platform (not shown) that stores a table or other suitable data structure in which identifiers of customers are stored in association with corresponding identifiers of service subscriptions.

The spectrum management device 114 evaluates portions of the CBRS, GAA, PAL frequency bands to determine whether communications using those frequency bands are meeting requirements. For example, an operator of the communication system 100 offers customers a variety of subscriptions for different levels of service. A Service-Level Agreement (SLA) is established for each level. Key Performance Indicators (KPIs) can be used to ensure that SLA requirements are met. 5G KPIs can be grouped into categories including Enhanced mobile broadband (eMBB), Ultra-reliable and low-latency communications (URLLC), and Massive machine type communication (mMTC). Different types of performance requirements can be associated with minimum KPI requirements for each category.

For example, KPI requirement types of peak data rate, peak spectral efficiency, data rate experienced by user, area traffic capacity, latency (User Plane), connection density, average spectral efficiency, energy efficiency, reliability, mobility, mobility interruption time, and bandwidth can be established and associated with specific minimum KPI values for different categories of services. For example, for the eMBB category, the peak data rate type is associated with a minimum KPI requirement of 20 Gbps for downlink communications and a minimum KPI requirement of 10 Gbps for uplink communications. The peak spectral efficiency type is associated with a minimum KPI requirement of 30 bits/sec/Hz for downlink communications and a minimum KPI requirement of 105 bits/sec/Hz for uplink communications. The data rate experienced by user type is associated with a minimum KPI requirement of 100 Mbps for downlink communications and a minimum KPI requirement of 50 Mbps for uplink communications. The area traffic capacity type is associated with a minimum KPI requirement of 10 Mbits/sec/m for downlink communications. The latency (User Plane) type is associated with a minimum KPI requirement of 4 ms for downlink communications and 20 ms for uplink communications. The average spectral efficiency type is associated with a minimum KPI requirement of 7.8 bits/sec/Hz/TRxP for downlink communications and 6.75 bits/sec/Hz/TRxP for uplink communications. The mobility type is associated with a minimum KPI requirement of 30 Km/h. The mobility interruption time type is associated with a minimum KPI requirement of 0 ms. The bandwidth type is associated with a minimum KPI requirement of at least 100 MHz and up to 1 GHz for operation in high frequency bands (e.g., greater than 6 GHz). In one or more implementations, the spectrum management device 114 evaluates portions of the CBRS, GAA, PAL frequency bands to determine whether the above minimum KPI requirements are being met. In one or more implementations, the spectrum management device 114 evaluates portions of the CBRS, GAA, PAL frequency bands to determine whether various KPIs indicate that one or more Quality of Service (QoS) requirements are not being met. In one or more implementations, such QoS requirements are based on a QoS model defined by 3GPP TS 23.501 V15.13.0 (2022-03).

Additionally, the spectrum management device 114 evaluates portions of frequency bands (e.g., 2.4 GHz, 5 GHz, or 6 GHz) that are used for WLAN communications (e.g., Wi-Fi) and determines whether minimum KPI requirements and QoS flows are being met. If a required QoS is not being met, the spectrum management device 114 reconfigures the private network 102 to deliver the required QoS, for example, by allocating additional bandwidth of a particular spectrum band dynamically when required. When the additional bandwidth is no longer needed, the spectrum management device 114 removes the allocation.

Thus, according to the present disclosure, unlike conventional spectrum management solutions that only manage Wi-Fi spectrum or cellular (5G/4G LTE) spectrum, the use of both Wi-Fi and cellular spectrum is orchestrated at the same time for access point devices to communicate with end user devices (e.g., User Equipment (UE) devices), and for access point devices to communicate with other access point devices. Also, according to the present disclosure, unlike conventional spectrum management solutions that only manage Wi-Fi spectrum or cellular (5G/4G LTE) spectrum, spectrum management devices reconfigure the access point devices of private networks to deliver a required QoS using both WLAN frequency bands (e.g., Wi-Fi frequency bands) and cellular frequency bands (e.g., 4G and 5G frequency bands). In addition, frequency bands that are already licensed by a network operator (e.g., DISH network) can be dynamically allocated to customers based on their real-time needs. Thus, costs can be optimized resulting in customer savings as resources and subscription services can be removed when not needed.

Figure 2:
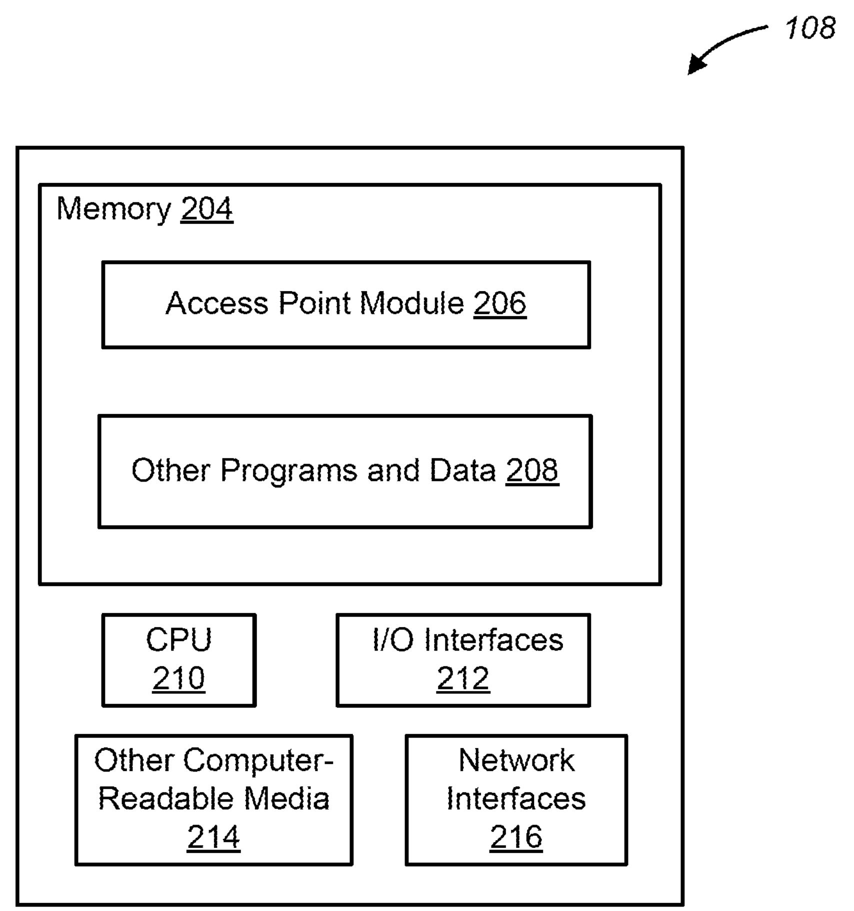
FIG. 2 is a block diagram illustrating an example of an access point device in accordance with embodiments described herein.

FIG. 2 is a block diagram illustrating an example of an access point device 108 in accordance with embodiments described herein. The access point devices 108-1, 108-2, and 108-3 shown in FIG. 1 have the same configuration as the access point device 108. In some embodiments, one or more special-purpose computing systems may be used to implement the access point device 108. Accordingly, various embodiments described herein may be implemented in software, hardware, firmware, or in some combination thereof. The access point device 108 may include one or more memory devices 204, one or more central processing units (CPUs) 210, I/O interfaces 212, other computer-readable media 214, and network interfaces 216.

The one or more memory devices 204 may include one or more various types of non-volatile and/or volatile storage technologies. Examples of the one or more memory devices 204 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. The one or more memory devices 204 may be utilized to store information, including computer-readable instructions that are utilized by the one or more CPUs 210 to perform actions, including those of embodiments described herein.

The one or more memory devices 204 may have stored thereon an access point module 206. The access point module 206 is configured to implement and/or perform some or all of the functions of the access point device 108 described herein. The one or more memory devices 204 may also store other programs and data 208, which may include digital certificates, connection recovery algorithms, connection recovery rules, network protocols, O-RAN operating rules, user interfaces, operating systems, etc.

I/O interfaces 212 may include enhanced Common Public Radio Interface (eCPRI) ports, Antenna Interface Standards Group (AISG) interfaces, other data input or output interfaces, or the like. Other computer-readable media 214 may include other types of stationary or removable computer-readable media, such as removable flash drives, external hard drives, or the like. Network interfaces 216 are configured to communicate with other computing devices including client device and other access point devices. In various embodiments, the network interfaces 216 include transmitters and receivers, a layer 2 (L2) switch and physical network ports (not illustrated) to send and receive data as described herein, and to send and receive instructions, commands and data to implement the processes described herein. For example, some of the transmitters and receivers of the network interfaces 216 are configured to transmit and receive information according to IEEE 802.11 communication standards (e.g., 802. 11, 802.11a, 802.11, 802.11g, 802.11n, 802.11ac, 802.11ax, 802.11be, etc.), and some of the transmitters and receivers of the network interfaces 216 are configured to transmit and receive information according to cellular communication standards (e.g., 4G LTE, 5G, etc.).

Figure 3:
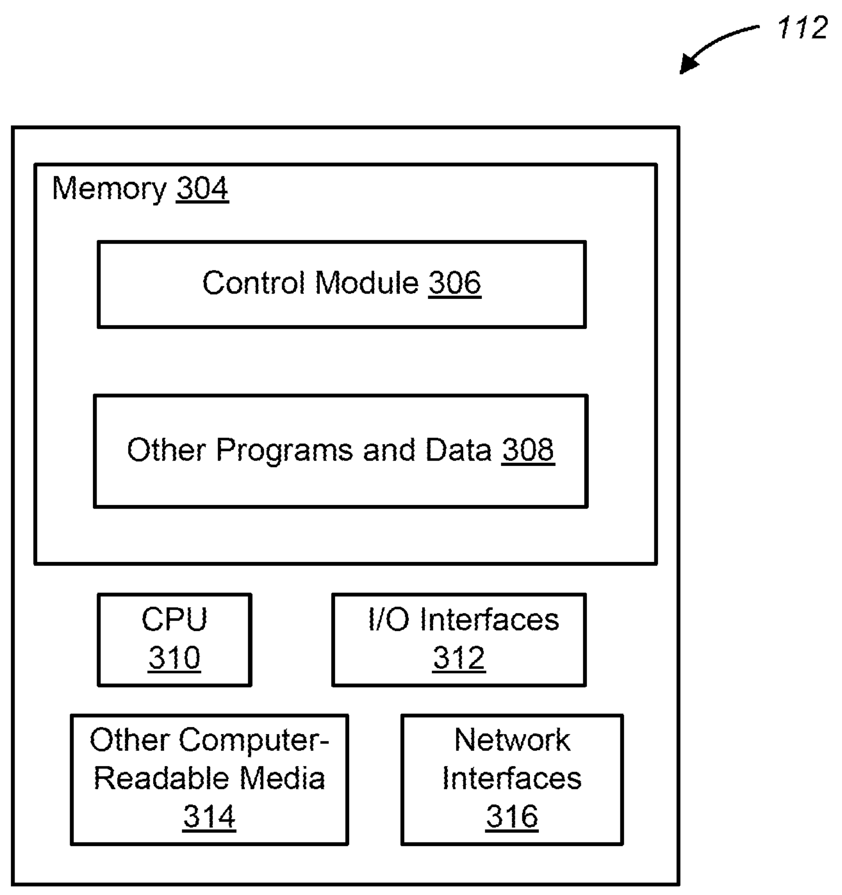
FIG. 3 is a block diagram illustrating an example of a private network control device in accordance with embodiments described herein.

FIG. 3 is a block diagram illustrating an example of a control device 112 in accordance with embodiments described herein. In some embodiments, one or more special-purpose computing systems may be used to implement the control device 112. Accordingly, various embodiments described herein may be implemented in software, hardware, firmware, or in some combination thereof. The control device 112 may include one or more memory devices 304, one or more central processing units (CPUs) 310, I/O interfaces 312, other computer-readable media 314, and network interfaces 316.

The one or more memory devices 304 may include one or more various types of non-volatile and/or volatile storage technologies. Examples of the one or more memory devices 304 may include, but are not limited to, flash memory, hard disk drives, optical drives, solid-state drives, various types of RAM, various types of ROM, other computer-readable storage media (also referred to as processor-readable storage media), or the like, or any combination thereof. The one or more memory devices 304 may be utilized to store information, including computer-readable instructions that are utilized by the one or more CPUs 310 to perform actions, including those of embodiments described herein.

The one or more memory devices 304 may have stored thereon a control module 306. The control module 306 is configured to implement and/or perform some or all of the functions of the control device 112 described herein. The one or more memory devices 304 may also store other programs and data 308, which may include programs for communicating with the spectrum management device 114 and the access point devices 108-1, 108-2, and 108-3, digital certificates, network protocols, user interfaces, operating systems, etc.

I/O interfaces 312 may include enhanced data input or output interfaces, or the like. Other computer-readable media 314 may include other types of stationary or removable computer-readable media, such as removable flash drives, external hard drives, or the like. Network interfaces 316 are configured to communicate with other computing devices including the spectrum management device 114 and the access point devices 108-1, 108-2, and 108-3. In various embodiments, the network interfaces 316 include transmitters and receivers, physical network ports (not illustrated) to send and receive data as described herein, and to send and receive instructions, commands and data to implement the processes described herein.

Figure 4:
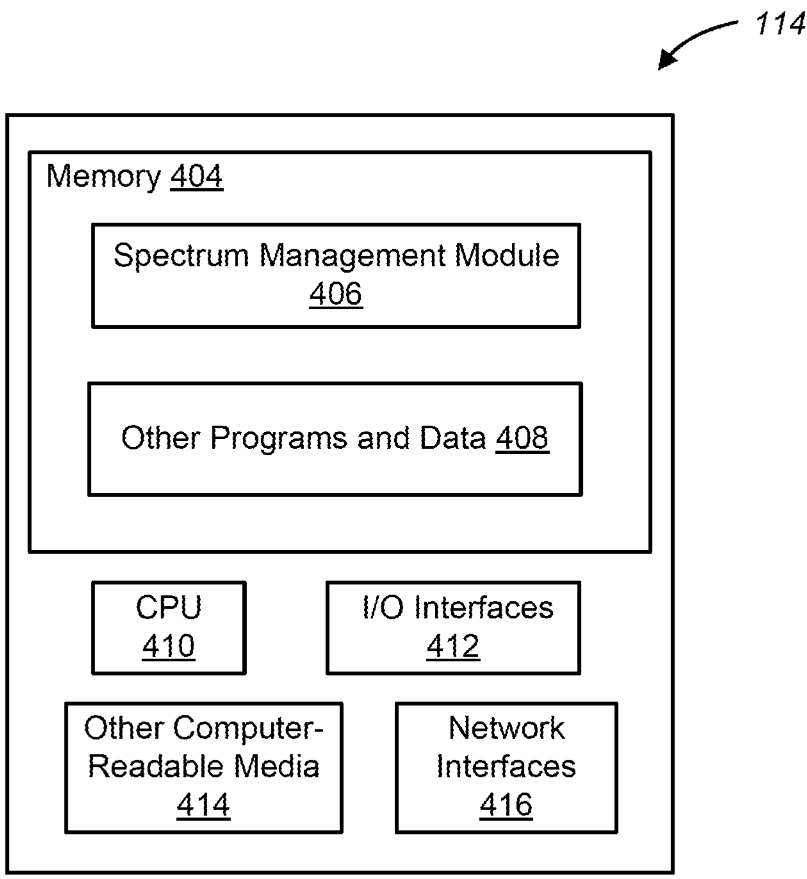
FIG. 4 is a block diagram illustrating an example of a spectrum management device in accordance with embodiments described herein.

FIG. 4 is a block diagram illustrating an example of a spectrum management device 114 in accordance with embodiments described herein. In some embodiments, one or more special-purpose computing systems may be used to implement the spectrum management device 114. Accordingly, various embodiments described herein may be implemented in software, hardware, firmware, or in some combination thereof. The spectrum management device 114 may include one or more memory devices 404, one or more central processing units (CPUs) 410, I/O interfaces 412, other computer-readable media 414, and network interfaces 416.

The one or more memory devices 404 may include one or more various types of non-volatile and/or volatile storage technologies. Examples of the one or more memory devices 404 may include, but are not limited to, flash memory, hard disk drives, optical drives, solid-state drives, various types of RAM, various types of ROM, other computer-readable storage media (also referred to as processor-readable storage media), or the like, or any combination thereof. The one or more memory devices 404 may be utilized to store information, including computer-readable instructions that are utilized by the one or more CPUs 410 to perform actions, including those of embodiments described herein.

The one or more memory devices 404 may have stored thereon a control module 406. The control module 406 is configured to implement and/or perform some or all of the functions of the spectrum management device 114 described herein. The one or more memory devices 404 may also store other programs and data 408, which may include digital certificates, network protocols, user interfaces, operating systems, etc., programs for communicating with the control device 112, the access point devices 108-1, 108-2, and 108-3, Spectrum Access System (SAS) service provider devices, and devices that maintain databases of frequency bands for licenses that have already been acquired by an operator of the communication system 100.

I/O interfaces 412 may include enhanced data input or output interfaces, or the like. Other computer-readable media 414 may include other types of stationary or removable computer-readable media, such as removable flash drives, external hard drives, or the like. Network interfaces 416 are configured to communicate with other computing devices including the control device 112, the access point devices 108-1, 108-2, and 108-3, Spectrum Access System (SAS) service provider devices, and devices that maintain databases of frequency bands for licenses that have already been acquired. In various embodiments, the network interfaces 416 include transmitters and receivers, physical network ports (not illustrated) to send and receive data as described herein, and to send and receive instructions, commands and data to implement the processes described herein.

Figure 5A:
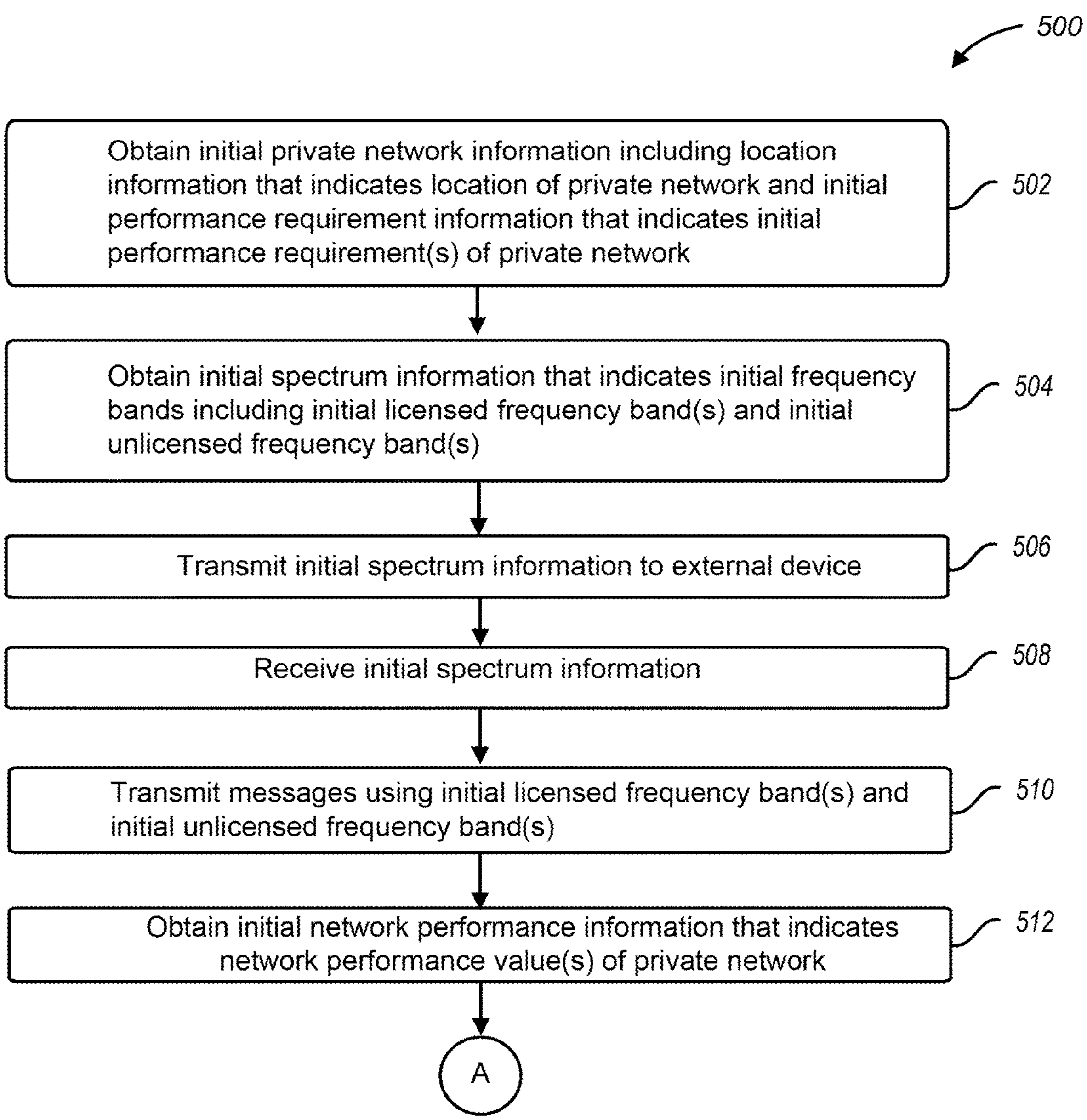
FIGS. 5A and 5B illustrate a logical flow diagram showing an example of a method of operating a communication system in accordance with embodiments described herein.
Figure 5B:
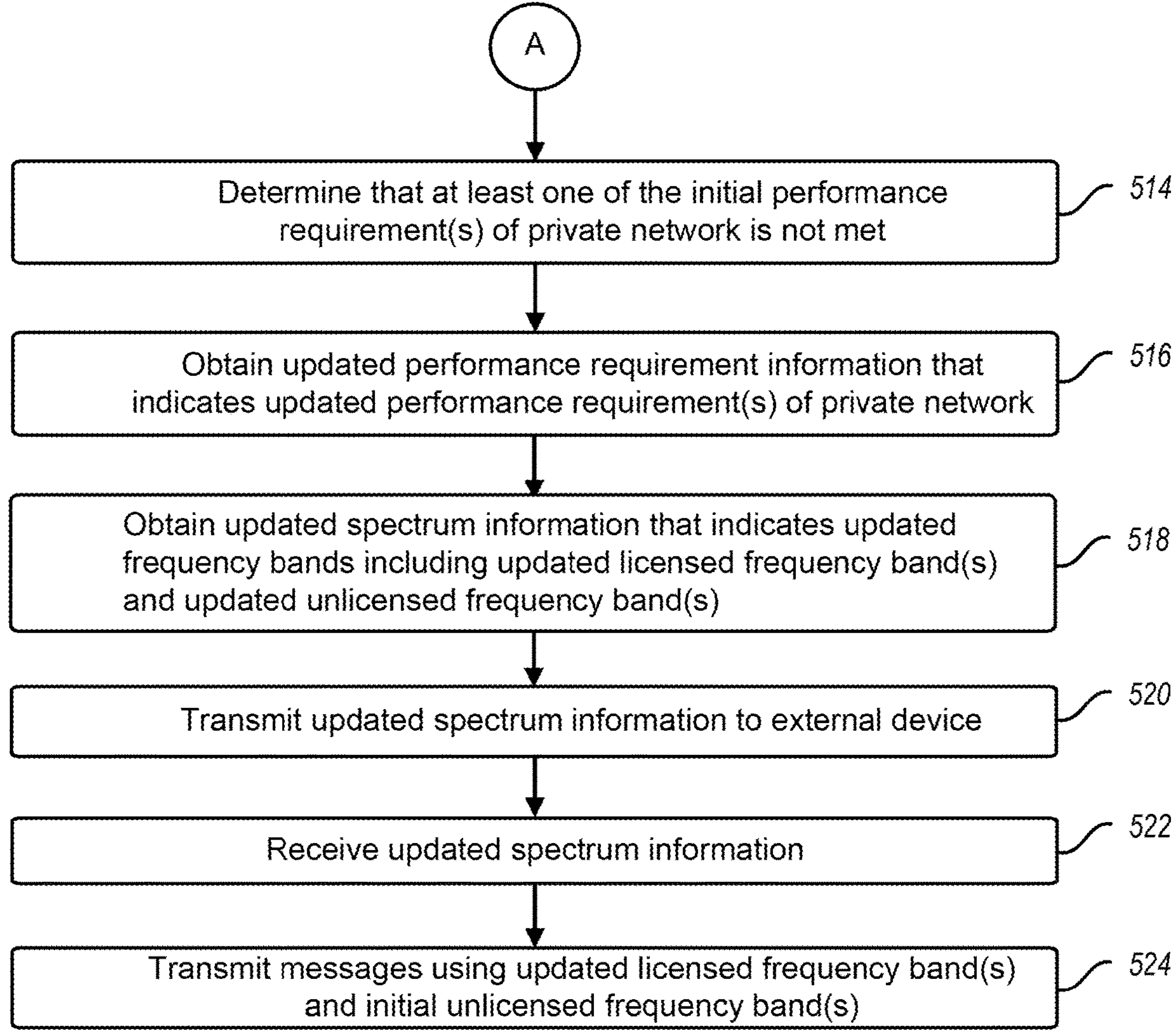

FIGS. 5A and 5B illustrate a logical flow diagram showing an example of a method 500 of operating a communication system in accordance with embodiments described herein. The method 500 begins at 502 in FIG. 5A.

At 502, initial private network information is obtained, wherein the initial private network information includes location information that indicates a location of a private network and initial performance requirement information that indicates one or more initial performance requirements of the private network. The method 500 then proceeds to 504.

For example, at 502, the spectrum management device 114 obtains initial private network information from the control device 112, wherein the wherein the initial private network information includes location information that indicates a location of the private network (zip code, latitude and longitude coordinates, etc.) and initial performance requirement information that indicates one or more initial performance requirements of the private network (bandwidth, throughput, latency, priority level, etc.). In one or more implementations, the initial private network information includes preassigned network performance and loading thresholds and alarm settings. In one or more one or more implementations, the spectrum management device 114 generates or otherwise obtains preassigned network performance and loading thresholds and alarm settings based on the initial private network information.

At 504, initial spectrum information is obtained based on the initial private network information obtained at 502, wherein the initial spectrum information indicates initial frequency bands including one or more initial licensed frequency bands (e.g., n48 band) and one or more initial unlicensed frequency bands (e.g., Wi-Fi bands). The method 500 then proceeds to 506.

For example, the spectrum management device 114 stores a table or other suitable data structure in which a plurality of requirements are associated with corresponding amounts of bandwidth required to meet those requirements, and at 504, the spectrum management device 114 uses each of the initial performance requirements to obtain corresponding bandwidth values. The spectrum management device 114 then sums the obtained bandwidth values to obtain a total amount of bandwidth necessary to satisfy the initial performance requirements. The spectrum management device 114 then queries a device that stores a table or other suitable data structure in which a plurality of identifiers of locations are associated with corresponding frequency bands that are available in those locations, to obtain potential frequency bands to be allocated to the private network 102. The spectrum management device 114 selects one or more of the potential frequency bands that have at least the total amount of bandwidth necessary to satisfy the initial performance requirements to be allocated to the private network 102.

For example, the private network 102 is located in a stadium that is used to host sporting events and musical concerts. During day-to-day operations, when no sporting events and musical concerts are being held in the stadium, at 504, the spectrum management device 114 obtains initial spectrum information that indicates initial frequency bands that are Wi-Fi or n48 CBRS GAA frequency bands.

At 506, the initial spectrum information obtained at 504 is transmitted to an external device. For example, at 506, the spectrum management device 114 transmits the initial spectrum information to the control device 112, which transmits the initial spectrum information to the access point devices 108-1, 108-2, and 1018-3. By way of another example, at 504, the management device 114 transmits the initial spectrum information to the access point devices 108-1, 108-2, and 108-3. The method 500 then proceeds to 508.

At 508, the initial spectrum information transmitted at 506 is received by one or more access point devices. For example, at 508, the initial spectrum information transmitted at 506 is received by the access point devices 108-1, 108-2, and 1018-3. The method 500 then proceeds to 510.

At 510, messages are transmitted using one or more initial licensed frequency bands and one or more initial unlicensed frequency bands indicated by the initial spectrum information received at 508. For example, at 510, the access point device 108-1 transmits a first message to the client device 108-1 using one of the initial licensed frequency bands, and transmits a second message to the client device 108-2 using one of the initial licensed frequency bands. By way of example, the first message is transmitted according to an IEEE 802.11 communication standard, and the second message is transmitted according to a 3GPP communication standard for cellular communications. By way of another example, the first message and second message are transmitted according to the 3GPP communication standard for cellular communications. The method 500 then proceeds to 512.

At 512, initial network performance information is obtained, wherein the network performance information indicates one or more network performance values of the private network. For example, at 512, the spectrum management device 114 obtains initial network performance information that indicates actual throughput bandwidth, throughput, latency, priority level, and reliability in the private network 102 using the TR-369 protocol from the control device 112 or the access point devices 108-1, 108-2, and 108-3. The method 500 then proceeds to 514 in FIG. 5B.

In one or more implementations, at least some of the initial network performance information is obtained in response to the spectrum management device 114 transmitting to a test device (e.g., an access point device or a client device) a message that causes the test device to perform testing. For example, the test device performs a network speed test by transmitting one or more first messages (e.g., Internet Control Message Protocol (ICMP) messages) to a server device (e.g., control device 112 or spectrum management device 114), which responds by transmitting one or more second messages to the test device, and the test device determines a round trip time (e.g., average round trip time) based on those messages. The test device may also perform a download test by opening one or more connections to the server device and downloading data from the server device. In addition, the device may also perform an upload test by opening one or more connections to the server and uploading data to the server. The test device then transmits a message including results of the tests.

At 514, at least one of the initial performance requirements of the private network indicated by the initial performance requirement information obtained at 502 is determined to not be met. For example, at 514, the spectrum management device 114 determines that an initial throughput value obtained at 512 is less than a required throughput value obtained at 502, and determines that an initial latency value obtained at 512 is greater than a required latency value obtained at 502. In one or more implementations, the spectrum management device 114 determines that one or more preassigned network performance and loading thresholds and alarm settings has been exceeded. The method 500 then proceeds to 516.

At 516, updated performance requirement information is obtained, wherein the updated performance requirement information indicates one or more updated performance requirements of the private network. The method 500 then proceeds to 518.

For example, at 516, the spectrum management device 114 obtains updated performance requirement information from the control device 110, which a user has operated to indicate that the private network 102 is to support a first specified number of additional client devices that communicate using cellular communication standards, and to indicate that the private network 102 is to support a second specified number of additional client devices that communicate using Wi-Fi communication standards. In one or more implementations, the updated performance requirement information includes information indicating a first specified date and time, which may correspond to the beginning of a future sporting event or concert, by which updated frequency bands are to be obtained and configured in access point devices so that a specified QoS is provided to the additional clients, and a second specified date and time, which may corresponding to the end of the future sporting event or concert. Such prescheduling of frequency resources ensures that the specified QoS can be met at the beginning of an event (e.g., sporting event or concert) and throughout the entire event.

By way of another example, the updated performance requirement information includes identifiers of client devices, wherein each of the identifiers of client devices is associated with an identifier of one of a plurality of tiers. For example, the identifiers of client devices can include media access control (MAC) addresses, telephone numbers, International Mobile Equipment Identity (IMEI) numbers, International Mobile Subscriber Identity (IMSI) numbers, and/or other Subscriber Identity Module (SIM) profile information. Also, the tiers may include a first tier for newer cellular-capable client devices (e.g., devices capable of 5G communications), a second tier for older cellular-capable devices (e.g., devices capable of only 4G Long Term Evolution (LTE) communications), a third tier for newer WLAN-capable devices (e.g., devices capable of Wi-Fi 6 communications), and a fourth tier for older WLAN-capable devices (e.g., devices capable of only Wi-Fi 3 communications). Accordingly, QoS can be managed and assigned the device level, and the spectrum management device 114 can assign frequency bands such that device-specific QoS requirements are met.

At 518, updated spectrum information is obtained based on the updated private network information obtained at 516, wherein the updated spectrum information indicates updated frequency bands including one or more updated licensed frequency bands (e.g., n48 band) and one or more updated unlicensed frequency bands (e.g., Wi-Fi bands). In one or more implantations, the updated spectrum information includes pricing information indicating a cost associated with the updated frequency bands (e.g., one or more updated licensed frequency bands not included in the one or more initial licensed frequency bands). The method 500 then proceeds to 520.

For example, the spectrum management device 114 uses each of the updated performance requirements to obtain corresponding bandwidth values. The spectrum management device 114 then sums the obtained bandwidth values to obtain a total amount of bandwidth necessary to satisfy the updated performance requirements. The spectrum management device 114 then obtains potential frequency bands to be allocated to the private network 102. The spectrum management device 114 selects one or more of the potential frequency bands that have at least the total amount of bandwidth necessary to satisfy the updated performance requirements to be allocated to the private network 102. If the potential frequency bands do not have at least the total amount of bandwidth necessary to satisfy the updated performance requirements, the spectrum management device 114 transmits to a Spectrum Access System (SAS) service provider device a message that causes licenses for a number of CBRS bands to be acquired, so that the potential frequency bands now have at least the total amount of bandwidth necessary to satisfy the updated performance requirements.

Referring once again to the example in which the private network 102 is located in a stadium that is used to host sporting events and musical concerts. On a day when a sporting event or musical concert is being held in the stadium, at 518, the spectrum management device 114 obtains updated spectrum information that indicates updated frequency bands that are Wi-Fi, n48 CBRS GAA, n48 CBRS PAL, and n77 frequency bands.

At 520, the updated spectrum information obtained at 518 is transmitted to the external device. For example, at 520, the spectrum management device 114 transmits the updated spectrum information to the control device 112, which transmits the initial spectrum information to the access point devices 108-1, 108-2, and 1018-3. By way of another example, at 520, the management device 114 transmits the updated spectrum information to the access point devices 108-1, 108-2, and 108-3. The method 500 then proceeds to 522.

At 522, the updated spectrum information transmitted at 506 is received by one or more access point devices. For example, at 508, the updated spectrum information transmitted at 506 is received by the access point devices 108-1, 108-2, and 1018-3. The method 500 then proceeds to 524.

At 524, messages are transmitted using one or more updated licensed frequency bands and one or more updated unlicensed frequency bands indicated by the updated spectrum information received at 522. For example, at 524, the access point device 108-1 transmits a third message to the client device 108-1 using one of the updated licensed frequency bands, and transmits a fourth message to the client device 108-2 using one of the updated licensed frequency bands. By way of example, the third message is transmitted according to an IEEE 802.11 communication standard, and the fourth message is transmitted according to a 3GPP communication standard for cellular communications. By way of another example, the third message and fourth message are transmitted according to the 3GPP communication standard for cellular communications. The method 500 then ends.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating a communication system, the method including:

obtaining, by a spectrum management device, location information that indicates a location of a private network and initial performance requirement information that indicates one or more initial performance requirements of the private network;

obtaining, by the spectrum management device, based on the location information and the initial performance requirement information, initial spectrum information that indicates a plurality of initial frequency bands for the private network, wherein the initial frequency bands include one or more initial licensed frequency bands and one or more initial unlicensed frequency bands;

providing, by the spectrum management device, the initial spectrum information to at least one access point device that is different from the spectrum management device to cause the at least one access point device to communicate with a first client device via the private network using at least one of the one or more initial licensed frequency bands and to communicate with a second client device via the private network using at least one of the one or more initial unlicensed frequency bands;

obtaining, by the spectrum management device, updated performance requirement information that indicates one or more updated performance requirements of the private network;

obtaining, by the spectrum management device, based on the updated performance requirement information, updated spectrum information that indicates a plurality of updated frequency bands, wherein the updated frequency bands include one or more updated licensed frequency bands and one or more updated unlicensed frequency bands, wherein the one or more updated licensed frequency bands are different from the one or more initial licensed frequency bands, and wherein the one or more updated unlicensed frequency bands are different from the one or more initial unlicensed frequency bands; and providing, by the spectrum management device, the updated spectrum information to the at least one access point device to cause the at least one access point device to communicate with the first client device via the private network using at least one of the one or more updated licensed frequency bands and to communicate with the second client device via the private network using at least one of the one or more updated unlicensed frequency bands.

2. The method according to claim 1, wherein a bandwidth of the plurality of updated frequency bands is greater than a bandwidth of the plurality of initial frequency bands.

3. The method according to claim 1, wherein a bandwidth of the plurality of updated frequency bands is less than a bandwidth of the plurality of initial frequency bands.

4. The method according to claim 1, further comprising:

obtaining, by the spectrum management device, initial network performance information that indicates one or more network performance values of the private network; and determining, by the spectrum management device, based on the initial network performance information, that at least one of the one or more initial performance requirements of the private network is not met, wherein the obtaining the updated performance requirement information that indicates the one or more updated performance requirements of the private network is in response to the determining that the at least one of the one or more initial performance requirements of the private network is not met.

5. The method according to claim 1, further comprising:

receiving, by at least one access point device, the initial spectrum information; and transmitting, by the at least one access point device, a first message to the first client device using at least one of the one or more initial licensed frequency bands; and transmitting, by the at least one access point device, a second message to the second client device using at least one of the one or more initial unlicensed frequency bands.

6. The method according to claim 5, further comprising:

receiving, by the at least one access point device, the updated spectrum information; and transmitting, by the at least one access point device, a third message to the first client device using at least one of the one or more updated licensed frequency bands; and transmitting, by the at least one access point device, a fourth message to the second client device using at least one of the one or more updated unlicensed frequency bands.

7. The method according to claim 5, wherein:

the transmitting the first message to the first client device using the at least one of the one or more initial licensed frequency bands includes transmitting the first message according to a 3rd Generation Partnership Project (3GPP) communication standard; and the transmitting the second message to the second client device using the at least one of the one or more initial unlicensed frequency bands includes transmitting the second message according to an Institute of Electrical and Electronics Engineers (IEEE) communication standard.

8. The method according to claim 5, wherein:

the transmitting the first message to the first client device using the at least one of the one or more initial licensed frequency bands includes transmitting the first message according to a 3rd Generation Partnership Project (3GPP) communication standard; and the transmitting the second message to the second client device using the at least one of the one or more initial unlicensed frequency bands includes transmitting the second message according to the 3GPP communication standard.

9. The method according to claim 1, wherein the obtaining the updated spectrum information includes:

transmitting, by the spectrum management device, a message that cause a license for at least one of the one or more updated licensed frequency bands to be acquired.

10. The method according to claim 9, further comprising:

transmitting, by the spectrum management device, a message that cause the license for at least one of the one or more updated licensed frequency bands to be terminated.

11. A spectrum management device for a private network, the spectrum management device comprising:

at least one memory that stores computer executable instructions; and at least one processor that executes the computer executable instructions to cause actions to be performed, the actions including:

obtain location information that indicates a location of a private network and initial performance requirement information that indicates one or more initial performance requirements of the private network;

obtain, based on the location information and the initial performance requirement information, initial spectrum information that indicates a plurality of initial frequency bands for the private network, wherein the initial frequency bands include one or more initial licensed frequency bands and one or more initial unlicensed frequency bands;

provide the initial spectrum information to at least one access point device that is different from the spectrum management device to cause the at least one access point device to communicate with a first client device via the private network using at least one of the one or more initial licensed frequency bands and to communicate with a second client device via the private network using at least one of the one or more initial unlicensed frequency bands;

obtain updated performance requirement information that indicates one or more updated performance requirements of the private network;

obtain, based on the updated performance requirement information, updated spectrum information that indicates a plurality of updated frequency bands, wherein the updated frequency bands include one or more updated licensed frequency bands and one or more updated unlicensed frequency bands, wherein the one or more updated licensed frequency bands are different from the one or more initial licensed frequency bands, and wherein the one or more updated unlicensed frequency bands are different from the one or more initial unlicensed frequency bands; and provide the updated spectrum information to the at least one access point device to cause the at least one access point device to communicate with the first client device via the private network using at least one of the one or more updated licensed frequency bands and to communicate with the second client device via the private network using at least one of the one or more updated unlicensed frequency bands.

12. The spectrum management device according to claim 11, wherein the actions further include:

obtain initial network performance information that indicates one or more network performance values of the private network; and determine, based on the initial network performance information, that at least one of the one or more initial performance requirements of the private network is not met, wherein the updated performance requirement information that indicates the one or more updated performance requirements of the private network is obtained in response to determining that the at least one of the one or more initial performance requirements of the private network is not met.

13. The spectrum management device according to claim 11, wherein the actions further include:

transmit a message that cause a license for at least one of the one or more updated licensed frequency bands to be acquired.

14. The spectrum management device according to claim 13, wherein the actions further include:

transmitting, by the spectrum management device, a message that cause the license for at least one of the one or more updated licensed frequency bands to be terminated.

15. The spectrum management device according to claim 13, wherein a bandwidth of the plurality of updated frequency bands is greater than a bandwidth of the plurality of initial frequency bands.

16. The spectrum management device according to claim 13, wherein a bandwidth of the plurality of updated frequency bands is less than a bandwidth of the plurality of initial frequency bands.

17. A non-transitory processor-readable storage medium having contents stored thereon that, when executed by one or more processors, cause the one or more processors to perform actions, the actions comprising:

obtaining location information that indicates a location of a private network and initial performance requirement information that indicates one or more initial performance requirements of the private network;

obtaining based on the location information and the initial performance requirement information, initial spectrum information that indicates a plurality of initial frequency bands for the private network, wherein the initial frequency bands include one or more initial licensed frequency bands and one or more initial unlicensed frequency bands;

providing the initial spectrum information to at least one access point device that is different from the spectrum management device to cause the at least one access point device to communicate with a first client device via the private network using at least one of the one or more initial licensed frequency bands and to communicate with a second client device via the private network using at least one of the one or more initial unlicensed frequency bands;

obtaining updated performance requirement information that indicates one or more updated performance requirements of the private network;

obtaining based on the updated performance requirement information, updated spectrum information that indicates a plurality of updated frequency bands, wherein the updated frequency bands include one or more updated licensed frequency bands and one or more updated unlicensed frequency bands, wherein the one or more updated licensed frequency bands are different from the one or more initial licensed frequency bands, and wherein the one or more updated unlicensed frequency bands are different from the one or more initial unlicensed frequency bands; and providing the updated spectrum information to the at least one access point device to cause the at least one access point device to communicate with the first client device via the private network using at least one of the one or more updated licensed frequency bands and to communicate with the second client device via the private network using at least one of the one or more updated unlicensed frequency bands.

18. The non-transitory processor-readable storage medium of claim 17, wherein the contents, when executed by the one or more processors, cause the one or more processors to perform further actions, the further actions comprising:

obtaining initial network performance information that indicates one or more network performance values of the private network; and determining, based on the initial network performance information, that at least one of the one or more initial performance requirements of the private network is not met, wherein the obtaining the updated performance requirement information that indicates the one or more updated performance requirements of the private network is in response to the determining that the at least one of the one or more initial performance requirements of the private network is not met.

19. The non-transitory processor-readable storage medium of claim 17, wherein the contents, when executed by the one or more processors to obtain the updated spectrum information, cause the one or more processors to perform further actions, the further actions comprising:

transmitting a message that cause a license for at least one of the one or more updated licensed frequency bands to be acquired.

20. The non-transitory processor-readable storage medium of claim 19, wherein the contents, when executed by the one or more processors, cause the one or more processors to perform further actions, the further actions comprising:

transmitting a message that cause the license for at least one of the one or more updated licensed frequency bands to be terminated.

* * * * *